J. R. Dey,
Making Matches,
No 38,096,    Patented Apr. 7, 1863.
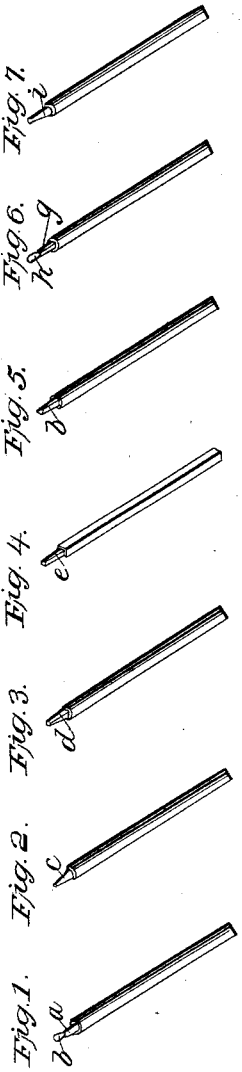

UNITED STATES PATENT OFFICE.

JAMES R. DEY, OF HUDSON CITY, NEW JERSEY.

IMPROVEMENT IN FRICTION-MATCHES.

Specification forming part of Letters Patent No. 38,096, dated April 7, 1863.

*To all whom it may concern:*

Be it known that I, JAMES R. DEY, of Hudson City, county of Hudson, and State of New Jersey, have invented certain new and useful Improvements in Friction-Matches; and I do hereby declare that the following is a full and correct description thereof, reference being had to the drawings annexed, making part of this specification, and to the letters of reference thereon.

The nature of the first part of my said invention consists in pointing the composition-tipped ends of friction-matches, for the purpose of reducing the quantity of phosphorated or other inflammable composition used to ignite the match.

The particular form of the body of the match-splints is not material. They may be square or of cylindrical form. The points may be conical, pyramidical or three-sided, or bayonet form, or of any analogous shape. They may be coated with brimstone, or impregnated with wax, stearic acid, resin, tallow, or other suitable material before dipping in the phosphorated or other composition ignitible by friction. I prefer glue to gum in the composition, on account of its adhering better to the small surface of the point.

The match-tips, when hardened, may be varnished as usual.

The match-splints may be pointed by hand-tools or by machinery. I do not intend herein to claim any particular way of pointing them, as it is obvious it may be done by a knife or pencil sharpener.

The drawings annexed illustrate my invention. Figure 1 is a cylindrical match with conical point $a$ tipped with inflammable composition at $b$; Fig. 2, a cylindrical match-splint with conical point $c$; Fig. 3, a cylindrical match-splint with pyramidical point, $d$; Fig. 4, a square match-splint with a pyramidical point, $e$; Fig. 5, a cylindrical match-splint with a three-sided or bayonet point, $f$; Fig. 6, a cylindrical match with pyramidical point $g$ and composition-tip $h$.

I do not wish to be understood as claiming a match simply beveled on the tipped end, as such matches would take up about the same quantity of composition as ordinary matches, and would be equally liable to accidental ignition by rubbing against each other when packed in bundles or boxes.

The composition-tips of my pointed matches need not be so large in diameter as to touch each other, when packed in bundles or boxes, and consequently are not so liable to accidental ignition.

The second part of my said invention consists in burring the point of the match-splint previous to dipping it, for the purpose of aiding the dipping operation, and more perfectly securing the composition-tip to the point of the match.

Fig. 7 is a match-splint, having the point slightly burred at the end $i$. This may be done by pressing the point of the match against any hard substance sufficiently to upset or burr the point, as shown. The burred point prevents the composition from flowing down from the point after dipping, so as to form a pendent drop from the extreme point of the match, which, when hardened, would be apt to break off by rubbing without igniting the match.

The burr is of great advantage to the pointed match, although not absolutely essential, as by very careful dipping in good adhesive composition, the tips may be sufficiently fastened to the matches without burring the points.

I claim as my invention and improvements in friction-matches—

1. The pointed friction-match substantially as described, the point being of a conical, pyramidical, three-sided, or bayonet form, or other analogous form, as set forth.

2. Burring the point of the pointed match-splint substantially as and for the purposes described.

JAMES R. DEY.

Witnesses:
F. C. TREADWELL, JR.,
D. C. BIRDSALL.